Aug. 9, 1955   J. R. HUBER   2,715,008
APPARATUS FOR CARGO TIE-DOWN AND THE LIKE
Filed April 3, 1950   2 Sheets-Sheet 1
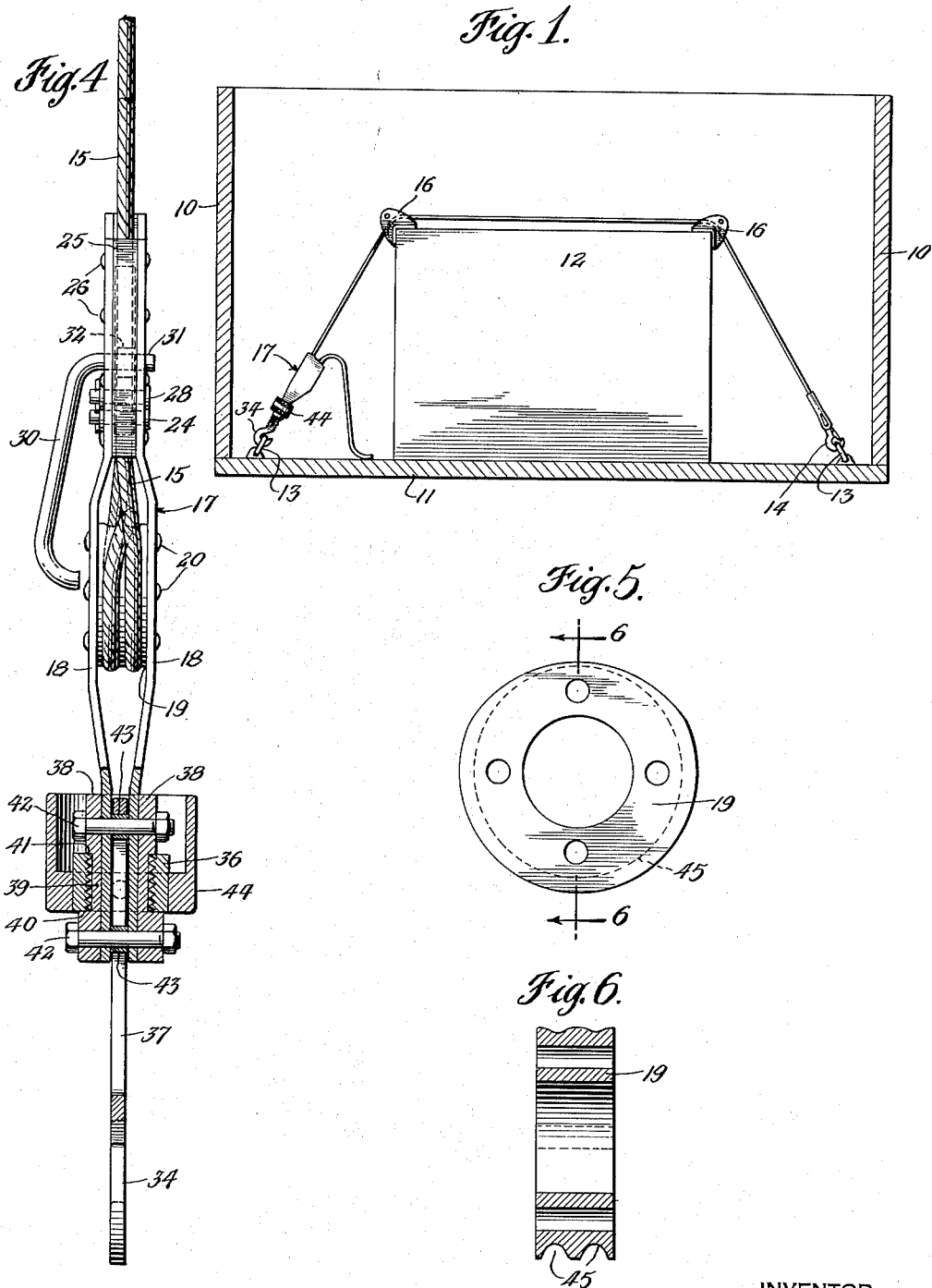
INVENTOR
J. Richard Huber
BY
Harris S. Campbell
ATTORNEY

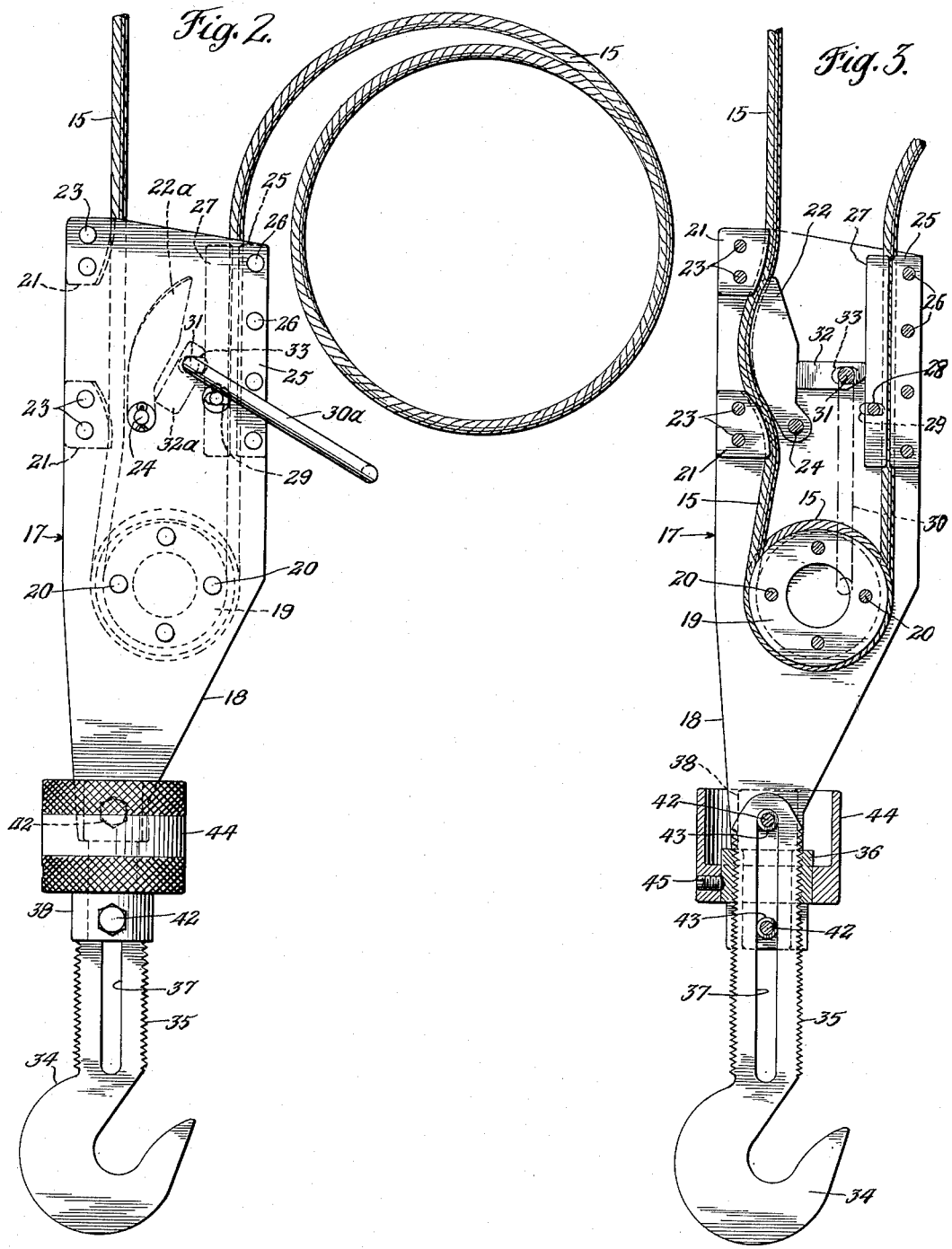

United States Patent Office 2,715,008
Patented Aug. 9, 1955

2,715,008

APPARATUS FOR CARGO TIE-DOWN AND THE LIKE

John Richard Huber, Warrington, Pa., assignor to Eastern Rotorcraft Corporation, Neshaminy, Pa., a corporation of Pennsylvania Application April 3, 1950, Serial No. 153,618

8 Claims. (Cl. 248—361)

This invention relates to securing apparatus suitable for retaining cargo in position in a vehicle during transportation or for other adjustable retention purposes.

In transporting heavy cargo, particularly in vehicles which are subject to considerable rough motion such as in aircraft, it is necessary to secure the cargo to prevent shift from one location to another. Such shift in aircraft or vessels can cause serious displacement of the center of gravity. In addition, the motion of heavy equipment can cause serious damage to the vehicle or to other cargo with which it might come in contact.

The present invention has as one of its primary objects the provision of an improved device for securing cargo during transport in a fashion which will permit quick adjustment of the securing apparatus to meet the conditions of the particular cargo being handled. At the same time, the securing apparatus is kept relatively simple in construction and light in weight.

One of the objects of the present invention is to provide securing equipment which can utilize high-strength flexible cable for the main securing member with an anchor device which permits quickly adjusting the length of the cable and anchoring it by means of pressure applied to the cable in a fashion which does not cause damage to the cable.

The present invention incorporates in the anchoring device a spool member around which the cable is passed to produce a snubbing action such that the end of the cable to which the anchoring pressure is applied carries a greatly reduced load as compared to the direct load applied to a cable. One of the objects of the invention is to provide a simplified spool construction which is effective in improving the action of the load transfer from the cable into the structure of the anchoring device before the cable reaches the point where clamping action is applied. The spool device of the present invention, therefore, incorporates a plurality of eccentric grooves which act to improve the snubbing action and which eliminate the need for machining a complicated spiral groove.

In order to prevent excessive pressure from being applied to the cable at times when such pressure is unnecessary for anchoring purposes, the present apparatus incorporates mechanism which applies a moderate initial pressure sufficient to retain the cable in position against all normal operating loads applied to it. For unusually large loads an additional clamping pressure is applied to the cable due to the action of the increased tension which is transmitted through suitable mechanism to increase the pressure applied to the anchoring mechanism. In addition, the present invention contemplates the use of large area clamping shoes which reduce the unit pressures of the clamping action.

In order to quickly apply or release the anchoring action of the device an external handle is provided which may be moved from release to locked position and vice versa. It is an object of the present invention to provide for automatic retention of the handle in the locked position through the action of suitable cam mechanism incorporated in the clamping linkage.

A further object of the present invention is to provide simplified tightening mechanism whereby the anchor cable may have an initial tension applied to it. This is accomplished by supporting the connecting hook of the anchor device in a fashion which permits its position to be changed with respect to the anchoring device by means of a screw-thread connection. The anchor hook involves a threaded attachment unit having a construction which permits easy manufacture and assembly of parts.

How the foregoing and other objects and advantages of the present invention are attained will be clear from the following description of the drawings in which—

Figure 1 illustrates an example of the application of the present apparatus in retaining cargo in position.

Figure 2 shows a longitudinal side view of the anchoring device of the present invention.

Figure 3 is a view generally similar to Figure 2 but with one of the side plates removed to more clearly illustrate the internal construction and anchoring mechanism.

Figure 4 is a longitudinal elevational view of the device with certain parts shown in section.

Figure 5 is a view of the snubbing drum.

Figure 6 is a sectional view taken along lines 6—6, Figure 5.

In Figure 1 there is illustrated a vehicle having side walls 10 and floor 11. A piece of heavy cargo in the form of a box or crate 12 is illustrated resting upon the floor 11. In order to provide for securing cargo, anchor rings such as indicated at 13 are provided at conveniently spaced locations along the cargo space of the vehicle. The cargo 12 is shown secured by the apparatus of the present invention. This apparatus includes a hook or snap member 14 which is hooked into one of the rings 13, a cable 15 which is attached to hook 14, protective members 16 and anchor device 17 to which the cable 15 is connected. The device 17 is connected to another ring 13.

While the anchor device has been indicated generally by numeral 17, it will be seen from Figures 2, 3 and 4 that this device incorporates side plates 18 which hold between them the spool member 19, rivets 20 being used for securely attaching the spool 19 to the frame plates 18. The cable 15 passes into the space between the side plates 18 and is arranged to pass between blocks 21 and the arc-shaped member 22. As will be evident, block members 21 are rigidly connected by rivets 23 to the frame members 18 while the arc-shaped member 22 is pivoted by means of pin 24 which extends through the side plates. The cable is then passed around the spool member 19 one and one-half turns and the free end of the cable passes between the long anchor block 25 which is fastened by rivets 26 and the floating anchor block 27 which is attached to said frame member by means of pivot 28. Slots 29 in plates 18 permit the floating action of block 27. It will be noted that the blocks 21, the arcuate member 22 and the anchor blocks 25 and 27 are all suitably grooved to accommodate the diameter of the cable being used.

In order to control the clamping and releasing of the cable a handle 30 is located outside the housing of the apparatus. This handle extends through the plate 18 and forms a pivot 31 to which is rigidly attached a cam device 32. The pivot 31 extends through slotted openings 33 in the side plates 18 in a fashion which permits the cam or block 32 to seek its stable position with respect to block 22 and shoe 27. With the cable in clamped position the cam member 32 is located as shown in full outline in Figure 3. In this position the length of the cam 32 is such that it forces the arcuate block 22 to swing on its pivot 24 so that it presses against the cable 15 and applies a pressure on it with blocks 21—21 as the cooperating members. This causes the cable to take up the curved shape of the arcuate member 22. The opposite end of the block 32 applies a pressure to the shoe 27 which is forced down to clamp the cable against the fixed shoe 25. It will be noted that the slots 29 in the side plates 18 permit the movable shoe 27 to engage the cable throughout its complete length although the block 27 is restrained against longitudinal motion by means of pivot 28. With the cam member in locked position the pressure is such that it maintains the flat end surfaces of the cam against the flat surfaces of the block 22 and the block 27 so that a definite force of considerable magnitude is required on the handle 30 in order to move the cam into the released position.

To release, the handle is moved to the position indicated at 30a in which position the cam block 32 assumes dotted position 32a and the arcuate member 22 moves to position 22a. Thus, the pressure is released from the cable at all points and the cable may take a straight line position past blocks 21 so that it may be easily withdrawn or adjusted without difficulty. With the cable unclamped it moves readily around the fixed spool 19. The open edges of the frame allow easy access for guiding the cable around the drum and between the clamping blocks during insertion. Adjustment may be made in the effective length of the cable merely by pulling on one end or the other.

In order to provide for anchoring the unit to a ring or other suitable point in a vehicle the hook member 34 is connected to the lower end of the plates 18 in a fashion which allows adjustment of the hook with respect to the plates. The adjustment is accomplished by means of threaded edges 35 of the hook 34 which engage the female thread of the collar 36. A slot 37 in the hook 34 provides for guiding the motion of the hook and limiting the travel. Collar 36 is supported on the side frame members 18 by means of shouldered sectional members 38 which are most clearly shown in Figure 4. Members 38 are shaped so that when in assembled position on the plates 18 they form a cylindrical section indicated by the numeral 39 with shoulders 40 and 41 to retain the threaded collar 36 in position. These parts 38 are assembled on the plates with the collar 36 already in position and with the hook 34 in place. Bolts 42 are then inserted, it being noted that small spacers 43 are located between the plates 18 and inside the slot 37 to properly locate the plates and permit the bolts to be tightened to retain the assembly. The large collar 44 is then moved into position on the outside of collar 36 and retained there by means of set screw 45. This external collar 44 may be knurled and gives a large and easily gripped handle for adjusting purposes. Thus, rotation of the collar 44 causes lengthening and shortening of the anchor unit inasmuch as the hook 34 is moved with respect to the side plates.

As will be seen from Figures 5 and 6 the spool or drum 19 incorporates grooves 45—45 which are parallel to each other. These grooves are formed in eccentric relationship to the drum 19 so that the deepest portion of the groove is located at the side of the drum opposite to the point of entry of the cable. The shallowest part of the groove is at the top end of the drum where the cable transfers to the adjacent groove after approximately one turn.

In operating the tie-down device the cable is normally retained in loose position around the spool so that with the hook 34 extended and anchored at a convenient point for retaining the cargo, the hook 14 on the cable 15 is passed over the cargo to another suitable anchoring point. The protecters 16 are adjusted to the corners of the cargo and the free end of the cable is then drawn through by hand so that all slack is removed. The handle 30 is then moved to locked position and the cable is then further tightened by rotating the collar 44 to produce an initial preload in the cable.

It will be noted that the cable in passing around the spool 19 makes one complete turn and then must pass to the adjacent groove to make the remaining one-half turn. This passing over of the cable from one groove to the next is done at the shallowest point of the groove which, as previously described, is eccentric with respect to the spool, the deepest part of the groove being at the bottom end of the spool. When the cable is tightened, due to a load or due to the clamping action of the locking device, the slight ridge between the grooves provides a further effective means of transferring load from the cable to the structure in addition to the friction developed by the snubbing action around the spool or drum 19. It is pointed out that the diameter of the drum 19 is preferably slightly less than the natural curvature which the cable will assume. Thus, when adjusting the cable it tends to spring away from the drum and slides readily when not under tension. Further, the radius at the bottom of the cable groove is preferably slightly less than the radius of the cable to provide for improved snubbing action under load.

It will be noted that any increase in load in the cable will have a tendency to cause straightening action of the cable at the points between the blocks 21—21 and this causes a pressure to be applied to the block 22 which pressure is transmitted to the cam member 32 and the block 27 so that an increasing clamping pressure is applied to the portion of the cable passing between the blocks 25 and 27. This action assures that slipping cannot occur in the event of an overload in the cable inasmuch as the increased load also increases the clamping action at the side of the cable beyond the snubbing point. This increased clamping load is applied only when required due to increase in load in the cable and, therefore, damage is less likely to occur to the cable than if this excess load were applied continuously. In addition, the manual clamping load applied through the handle is kept within a range which permits easy operation of the handle. The release of the handle immediately provides for release of the tension on the cable and this construction eliminates the need for additional quick-release mechanism.

From the foregoing discussion it will be evident that I have provided an improved type of tie-down unit which is simple in construction and provides a means for tying down cargo quickly and effectively. The device by means of its direct cable clamping action requires no protrusions or collars on the cable to reduce its flexibility and limit its versatility in use. At the same time the clamping mechanism is positive in action and is arranged to support the clamping load over a large area of cable on the low load or snubbed side of the cable where danger of damage due to clamping action is eliminated. This mechanism provides for increased clamping action with increased load in the cable. The snubber unit is simple to manufacture since the parallel grooves eliminate the need for spiral lead in their formation and at the same time the eccentric relationship of the grooves provides for increased effectiveness in the snubbing action. The adjustable hook for connecting the anchor device to the vehicle provides a simple and rapid means for placing an initial tension in the tie-down cable to prevent any motion from occurring due to accelerations during transportation. This hook construction which provides for threading a flat type of hook member cooperates effectively with the plate construction of the anchoring unit to form a compact and light-weight construction. It will be evident that this tie-down unit can be utilized for a variety of uses in addition to the tying down of cargo in vehicles. For example, it provides an improved means for tethering aircraft when they are stored in the open.

I claim:

1. A cable anchoring and adjusting device for transferring a tension load from the cable to a loading point, including a body having a snubbing drum attached thereto at a point remote from the upper end of said body, attachment means for anchoring the lower end of said body structure, a cable deflecting member located between said drum and the upper end of said body, a pair of clamping shoes located between said drum and the upper end of said body, an interconnecting link for transferring a load between said cable deflecting member and one of said clamping shoes, thereby providing for increased clamping pressure upon increase in cable tension acting through said cable deflecting member.

2. An adjustable tie-down device having a body with an anchoring member connected to the lower end for attaching to an anchor point, a flexible cable adapted to be attached to said body, a snubber drum attached to said body around which said flexible cable is wrapped, said drum being located remote from the upper end of said body, an arc-shaped cable deflecting member pivotally attached to said body between the drum and the upper end, a fixed elongated grooved clamping shoe attached to said body between said drum and the upper end, a movable grooved clamping shoe attached to said body in a position generally parallel to said fixed shoe, a load transfer cam member movably supported in said body, said transfer cam member being movable into position to engage said arc-shaped member and said movable shoe for applying a clamping pressure to said cable when in operative position.

3. A securing device for tying down cargo and the like including a frame with a pair of flat plates in spaced relationship, a cable, cable anchorage mechanism attached to said frame, mechanism for connecting said frame to an anchor point including a flat plate member having teeth formed in the edges thereof, said plate member being arranged to fit between the plates of said frame, said plate member further having an elongated slot therein, a threaded collar for engaging the teeth in said plate member, collar retaining parts arranged to fit outside of said frame plates, two fastening elements located to pass through said collar retaining parts, through said frame plates, and through the slot in said anchor plate, thereby retaining said collar and said frame members in position and serving to guide said anchor plate and limit its travel with respect to said frame.

4. A cargo securing device having a flexible tension cable, a body for adjustably anchoring said cable, anchoring means attached to one end of said body, a cable snubbing drum attached to said body, a pair of spaced blocks attached to one side of said body, an arc-shaped member located to be moved into position to bend said cable between said blocks to produce a resilient force due to the deformation of said cable between said blocks, clamping mechanism attached to the opposite side of said body for engaging the snubbed end of said cable, said mechanism incorporating a shoe supported in said body in a slot for floating action, a cam device for moving said arc-shaped member into operative position and for engaging said cable clamp, said cam device also being mounted in said body by a slotted opening, the deformed cable thereby acting as a resilient member to urge the cam toward said clamping mechanism and retain it in operative position.

5. A securing device for tying down cargo and the like including a frame having a pair of flat plates in spaced relationship, a tension element, mechanism attached to said frame for securing said tension element in adjusted position, anchoring mechanism for attaching said frame to a securing point including a flat plate member having teeth formed in the edges thereof and proportioned to fit between the flat plates of said frame, said flat plate member having a longitudinal slot therein, a threaded collar proportioned to engage the teeth in said plate member, a pair of retaining parts forming a split bushing to fit outside of said frame plates and having thrust shoulders to locate said threaded collar, and a pair of bolt members anchoring said retaining parts to said frame and passing through the slot of said flat plate member.

6. An adjustable cable tensioning device including a frame, an anchoring attachment at one end of said frame, a circular snubbing drum rigidly connected to said frame around which the cable may be wrapped more than one complete turn, a movable member attached to said frame and positioned to engage the load carrying portion of the cable before it passes around said drum, a clamping device having a member connected to said frame by a floating support for clamping the cable after it passes around said drum, and interconnecting linkage supported in floating relationship on said frame between said cable engaging member and said clamping device to provide for increasing the clamping action upon increase of tension in the cable.

7. An adjustable tie down device having a body with an anchoring member located at one end, cable clamping mechanism supported by said body including a fixed snubbing drum located in the mid section of said body, a movable cable engaging part located near the end of said body opposite the anchoring member to deflect the loaded side of the cable where it enters the body before passing around said drum, a clamp mechanism located at the end of said body opposite the anchoring member in position to engage the unloaded end of the cable after it has passed around said drum, movably mounted connecting means extending between said cable engaging part and said clamp mechanism to provide increased clamping upon increase in the cable load.

8. A securing device for holding cargo and the like including a frame having two flat plate members in generally spaced relationship, anchoring and adjusting mechanism for attaching said frame to a securing point including an elongated flat plate member having teeth formed along its edges, said elongated plate member being proportioned to fit between the frame plate members and having an elongated slot therein, a threaded collar proportioned to engage the teeth in the elongated plate member, thrust shoulder parts attached to said frame plate members and engaging said collar, a plurality of fastening elements extending through the slot in said elongated plate member and in to the frame plate members.

References Cited in the file of this patent

UNITED STATES PATENTS

| 190,666 | Cate | May 15, 1877 |
| 522,160 | Hancock | June 26, 1894 |
| 548,318 | Koch | Oct. 22, 1895 |
| 564,012 | Fraser | July 14, 1896 |
| 805,631 | Chapman | Nov. 28, 1905 |
| 928,367 | De Witt | July 20, 1909 |
| 1,305,353 | Gipson | June 3, 1919 |
| 1,433,616 | Helden | Oct. 31, 1922 |
| 1,553,430 | Bittle | Sept. 15, 1925 |
| 1,857,437 | Cole | May 10, 1932 |
| 1,885,732 | Krohn | Nov. 1, 1932 |
| 2,468,035 | Carroll | Apr. 26, 1949 |
| 2,469,783 | Pipia et al. | May 10, 1949 |
| 2,540,887 | Hyatt | Feb. 6, 1951 |

FOREIGN PATENTS

| 850 | Great Britain | Feb. 21, 1882 |
| 9,715 | Great Britain | Apr. 21, 1911 |